Jan. 13, 1970    E. J. SERFASS    3,489,337
PRESSURIZED AIR SUPPLY
Filed Nov. 21, 1967    3 Sheets-Sheet 2
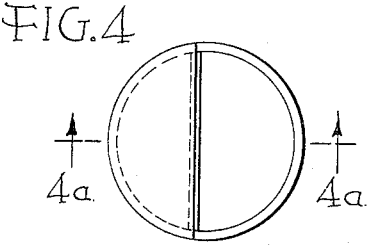
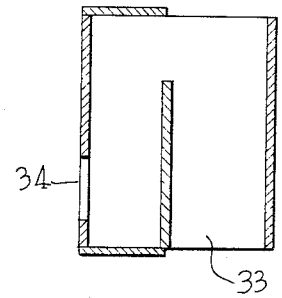
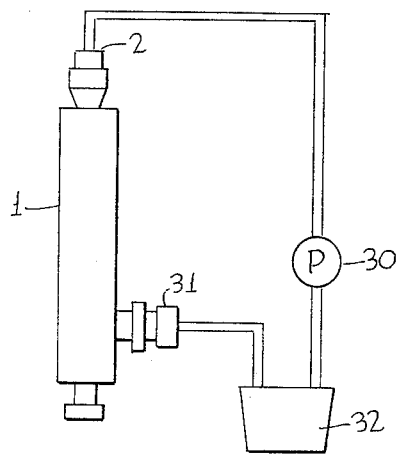
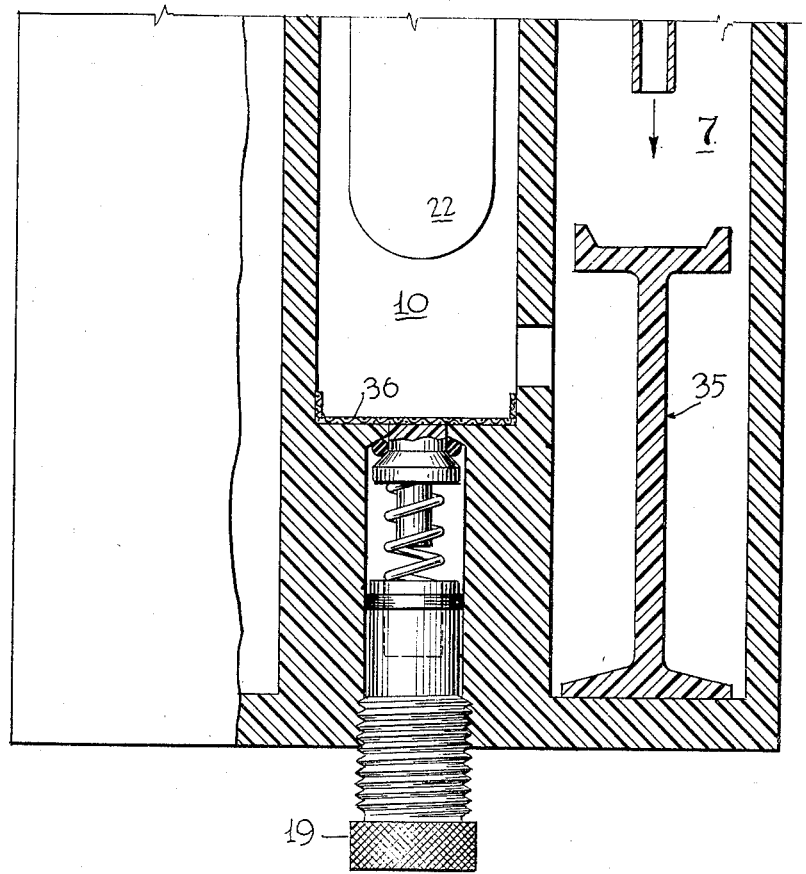

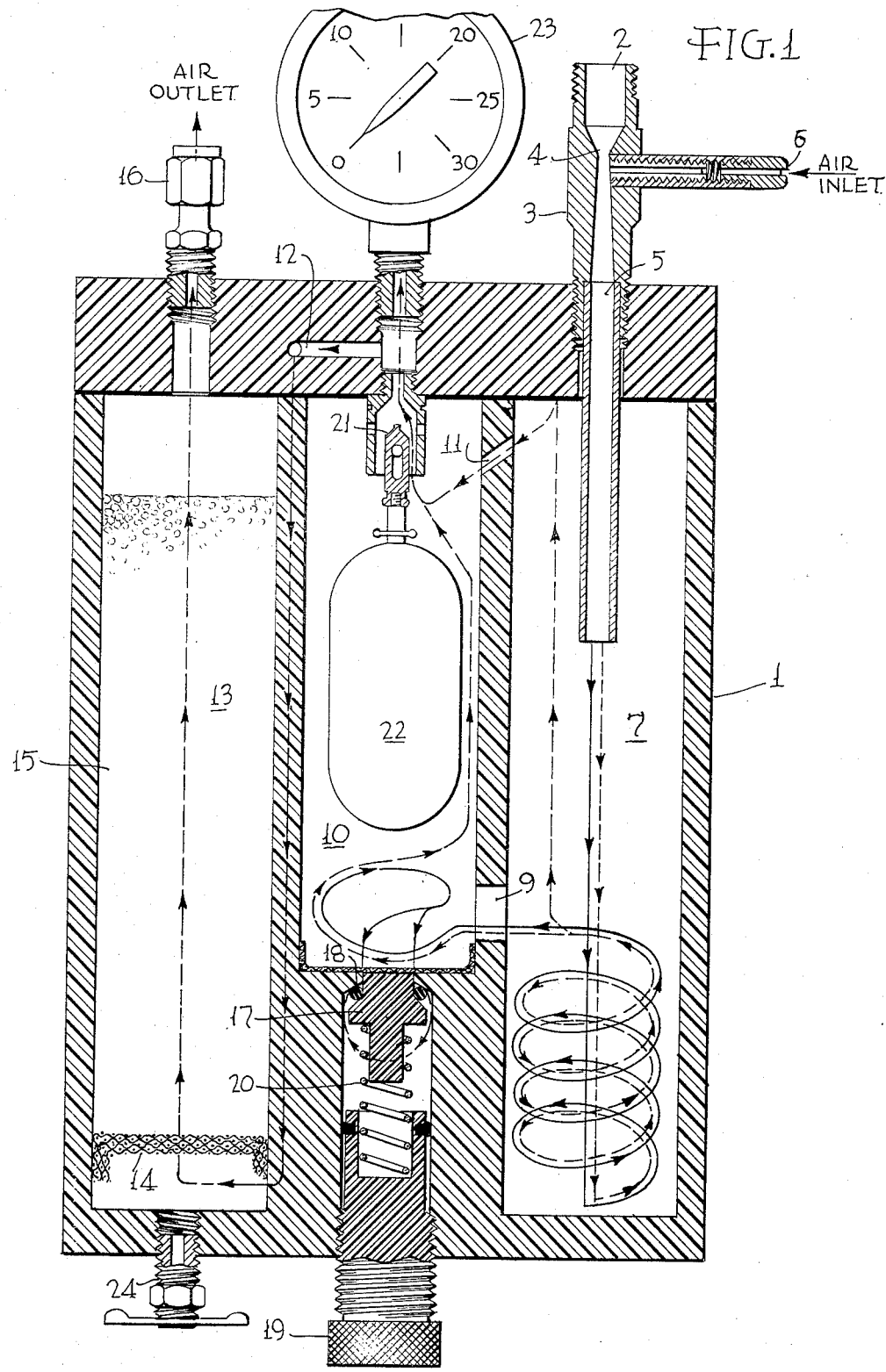

United States Patent Office 3,489,337
Patented Jan. 13, 1970

3,489,337
PRESSURIZED AIR SUPPLY
Earl J. Serfass, St. Petersburg, Fla., assignor to Milton Roy Company, St. Petersburg, Fla., a corporation of Pennsylvania
Filed Nov. 21, 1967, Ser. No. 684,750
Int. Cl. F04f 5/00
U.S. Cl. 230—92
7 Claims

ABSTRACT OF THE DISCLOSURE

The disclosure describes a water aspirator supplying a mixture of air or non-soluble gas and water to a disengaging chamber. The air is separated from the water in the disengaging chamber so that air under pressure accumulates at the top of the chamber and water accumulates at the bottom. Excess water escapes from the chamber through a back pressure regulator in the bottom of the chamber. Adjustment of the back pressure regulator provides the desired air pressure at the top of the chamber. This air is supplied from an air outlet at the top.

Background of the invention

Low cost compressors which supply air or gas for respiratory purposes or for laboratory or industrial use are commonly motor-driven. Such compressors have the disadvantage that an unnecessarily large volume of compressed air is produced and they have a high noise level. Also, water aspirators have been utilized for the production of laboratory vacuums. This involves the conversion of the relatively high static water pressure in the water supply mains to a high velocity head or dynamic pressure by passing the fluid through a convergent jet or nozzle. At the throat of this nozzle the static pressure is correspondingly reduced, in accordance with Bernoulli's theorem, to a low value. Static pressure at the throat of the nozzle may be made, as in the case of the water aspirator, as low as that of the vapor pressure of the fluid. Thus, the water aspirator is frequently used in the laboratory and plant as a vacuum pump.

Water-driven compressors are known for converting a static water head into a supply of air under pressure. However, prior art devices of this type have the disadvantages of poor regulation and poor conversion efficiency since much of the energy available in the static water head passes out into the effluent stream as kinetic energy of the moving liquid. Furthermore, prior devices of this type have not provided good separation of water from the air supply which is desirable in some applications.

Summary of the invention

This invention relates to apparatus for converting water pressure to a pressurized supply of air and to methods of treating air for respiratory purposes. A variety of gases and gas mixtures may be pressurized in place of air, providing said gases are not highly soluble in water.

It is an object of the present invention to provide a hydraulically actuated gas compressor of simple construction which will provide a regulated supply of pressurized air or gas.

It is another object of the present invention to provide a relative quiet method of providing humidified air for respiratory purposes such as the treatment of emphysema patients.

In accordance with one embodiment of the invention, the gas compressor includes a disengaging chamber having a water aspirator for supplying air and water under pressure to the disengaging chamber. The air is separated from the water and rises to the top of the chamber, from whence it is supplied under pressure to the desired use location. A back pressure regulator is connected in the water outlet at the bottom of the disengaging chamber. The back pressure regulator is adjustable to permit release of water through the water outlet when the pressure of water and air in the disengaging chamber reaches a desired level; thus the air pressure is adjustable. The disengaging chamber is divided into a plurality of compartments to provide good separation of water from air and to provide a cushion or reservoir of air.

In the treatment of air for emphysema patients, provision is made for recirculation of the water so that the unit is entirely portable. Such a system has the major advantage in that water-saturated air, rather than dry air, can be supplied to the patients and the temperature of the air can be regulated.

The foregoing and other objects, features and advantages of the invention will be better understood from the following more detailed description and appended claims together with the drawings.

Description of the drawings

FIG. 1 shows the air compressor;
FIG. 2 shows the air compressor connected in a recirculation system;
FIGS. 4 and 4a show a baffle which can be positioned in the disengaging chamber;
and
FIG. 5 shows a modification of the disengaging chamber.

Referring now to FIG. 1, there is shown a disengaging chamber 1. Water from a suitable source is supplied to the water inlet 2 of a water aspirator 3. Water aspirator 3 includes a convergent jet or nozzle 4 communicating through the outlet 5 to the interior of the disengaging chamber 1. Air from the atmosphere or gas is supplied through air inlet 6 to the throat of the nozzle 4. At the throat of nozzle 4 the static pressure is reduced, in accordance with Bernoulli's theorem, to a low value. A turbulent mixture of water and air is passed through the outlet 5 to a first compartment 7 of the disengaging chamber 1.

Figure 3:
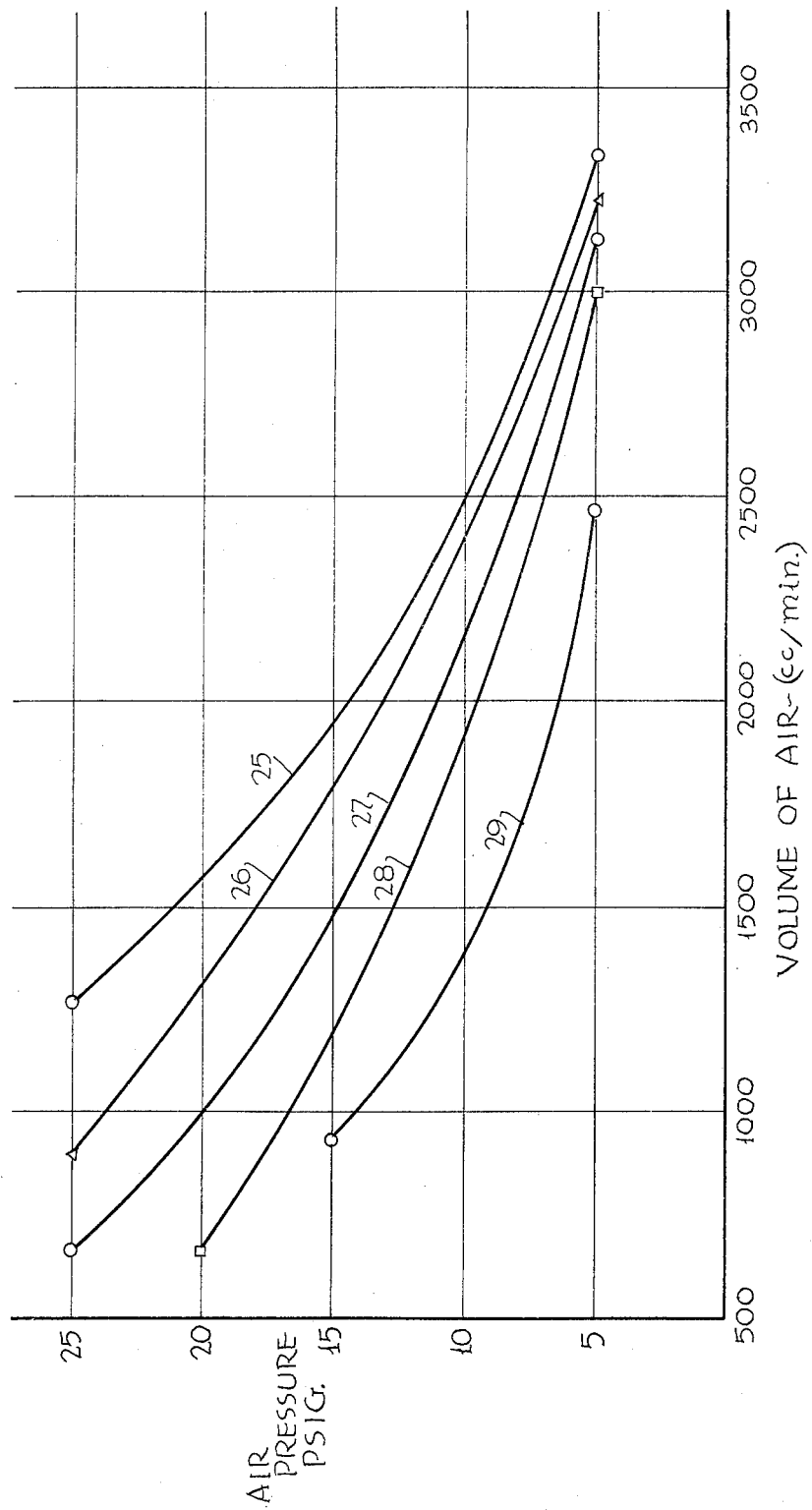
FIG. 3 shows performance curves of the air compressor.

At the bottom of compartment 7 the water and air are effectively separated because of the density and solubility difference. The fluid velocity head in the nozzle 4 is lowered as the mixture enters compartment 7 by virtue of the increased volume of the disengaging chamber. As a result, the static pressure in the disengaging chamber increases.

A passageway 9 is provided for flow of water from compartment 7 to another compartment 10. This compartment 10 is provided for further disengagement of the air from the water. Another passage 11 at the top of compartment 7 permits flow of air from compartment 7 to compartment 10.

Air in compartment 10 passes through a passageway 12 to the bottom of another compartment 13. Compartment 13 is utilized for further demisting and as a reservoir or cushion of air. A perforated plastic screen 14 is provided at the bottom of compartment 13, but above the opening of passageway 12, for separating large droplets of water from the air. In applications where dry air is desired, a drying material 15 may be provided. Examples of good drying materials are silica gel or phosphorous pentoxide. As will be subsequently explained, in a modification of the invention used for treatment of emphysema, the screen 14 and drying material 15 are omitted so that humified air may be supplied.

Air under pressure is supplied through the air outlet 16 at the top of the third compartment 13. In order to regulate the pressure of this air, a back pressure regulator is provided. This includes the valve 17 seated against an O-ring 18 which seals the outlet from compartment 10. When the pressure in the disengaging chamber 1 reaches a predetermined level, the valve 17 is unseated, thereby allowing water to flow out through a water outlet at the back of the gas compressor case. This water outlet is not shown in FIG. 1.

In order to regulate the pressure in the disengaging chamber 1, an adjusting knob 19 is provided. This is threaded in an opening in the disengaging chamber and changes the bias on the spring 20 which seats the valve 17.

The air compressor is made completely self-regulating by placing a float valve 21 in the opening to the passageway 12. If the use of pressurized air exceeds the volume which can be supplied by the unit, the water level rises in the compartment 10 until the float 22 closes the float valve 21. Excessive use over and above the amount of air supplied by the unit with a given flow rate of water will cause a shutdown of the air supply prior to the admission of water to the air outlet. On the other hand, if the use of compressed air is less than that supplied by the disengaging chamber under normal operating conditions, the level of the water in compartment 10 will gradually be lowered until a mixture of air and water passes through the back pressure regulator to drain.

A pressure gauge 23 at the top of compartment 10 provides means for reading the air pressure as it is being adjusted. A drain plug 24 is provided at the bottom of compartment 13. Over long periods of time there may be an accumulation of water at the bottom of compartment 13 and this may be drained when the unit is not in use.

In operation, the unit is simply connected to a water supply and the back pressure regulator is adjusted to the desired air pressure. Thus, there has been provided an air compressor without moving parts, other than the fluid water. The satisfactory operation of such an air compressor is shown by the curves of FIG. 3 showing the performance of an actual embodiment of the air compressor. The curves show the air pressure as a function of the value of air supply. Curve 25 shows the operation of the air compressor where the water source had a pressure of 50 lb. per square inch and a 1.6 gallon per minute flow rate; curve 26 shows the operation for 45 p.s.i., 1.5 g.p.m. flow rate; curve 27 shows the operation for 40 p.s.i., 1.45 g.p.m. flow rate; curve 28 shows the operation for 35 p.s.i., 1.4 g.p.m. flow rate; and curve 29 shows the operation for 30 p.s.i., 1.3 g.p.m. flow rate.

Modification of the invention

As shown in FIG. 2, the air compressor may be connected in a recirculation system to make the unit portable. A pump is connected between the water outlet 31 and the water inlet 2. One commercially available pump suitable for this purpose is the Transfer Pump supplied by the Milton Roy Company, St. Petersburg, Fla. Any pump having a capacity of approximately 50–75 p.s.i. at a delivery rate of 4–10 gallons per minute is suitable. In order to disengage air from the recirculating water, an open vessel 32 is provided. The open vessel 32 provides a cistern for the recirculating water. When air is not being used from the air outlet of the air compressor, a mixture of air and water emerges from the water outlet 31. The cistern separates this air from the recirculating water. Such a system is particularly suitable for use in treating emphysema patients. It is portable, quiet in operation, and provides a good source of humified air.

When used for such a purpose, the plastic screen 14 and the drying material 15 may be removed so that humified air is supplied to the patient. In this case, it may be desirable to provide a baffle in the compartment 10 and another baffle in the compartment 13. One suitable baffle for positioning at the bottom of compartment 10 is shown in FIGS. 4 and 4a. The baffle is circular in cross-section and fits snugly in the bottom of compartment 10. One half of the baffle is open at 33 to permit water to flow through the water outlet at the bottom of compartment 10. When such a baffle is used, the passageway 12 may be omitted and, instead, a straight passage at the bottom of compartment 10 may be provided. The baffle shown in FIGS. 4 and 4a has a hole 34 which aligns with the passage in the wall of compartment 10 to permit air to flow from compartment 10 to compartment 13.

It has been found that a spool-shaped baffle positioned at the bottom of compartment 13 provides the desired disengagement of large water drops from the air while still allowing water vapor to remain in the air, as is desirable in the treatment of emphysema patients.

In FIG. 5 there is shown a variation of the disengaging chamber 7 of FIG. 1. A spool device 35 is placed in this chamber for more efficient disengaging of air or gas from water. The spool device 35 has water clearance on its sides but full fluid and air velocity hit the center. An additional screen 36 is placed at the water outlet in the chamber 10 to disengage smaller particles of air reaching this point.

While particular embodiments of the invention have been shown and described, it will be understood that various other modifications are possible without departing from the principles of the invention. The appended claims are, therefore, intended to cover any such modifications.

What is claimed is:

1. Apparatus for converting water pressure to a pressurized supply of air comprising:
   a disengaging chamber,
   a water aspirator having a nozzle with a water inlet and outlet and an air inlet connected to the throat of said nozzle, said water inlet being connected to a water supply,
   a water outlet at the bottom of said disengaging chamber,
   a back pressure regulator in said water outlet, said back pressure regulator being adjustable to permit release of said water through said water outlet when the static pressure of water in said disengaging chamber reaches a desired level so that the static air pressure present in the space at the top of said disengaging chamber may be adjusted,
   said disengaging chamber having at least two laterally spaced compartments, said water outlet of the water aspirator being connected to the top of one of said compartments, and
   an air outlet in the top of another of said compartments, said air outlet being laterally displaced from said water inlet to facilitate disengagement of the air from the water, said compartments being interconnected by a passageway to permit flow of air toward said air outlet and flow of said water toward said water outlet.

2. The gas compressor recited in claim 1 further including a float valve connected in the passageway supplying air to said second compartment, said float valve closing said last-named passageway when the level of water in said compartment rises to a predetermined level so that water cannot pass through said last-named passageway.

3. The gas compressor recited in claim 1 further including a plurality of baffles at the bottom of at least one of said compartments to separate the water and air.

4. The apparatus recited in claim 1 further comprising:
   a transfer pump connected between said water outlet and the water inlet of said water aspirator to recirculate water through said disengaging chamber.

5. The apparatus recited in claim 1 further including an open vessel serving as a cistern for said recirculating water, the water outlet of said disengaging chamber being connected to said open vessel, said open vessel being connected to said pump.

6. A gas compressor comprising:
a disengaging chamber,
a water aspirator having a nozzle with a water inlet connected to the throat of said nozzle, said water inlet being connected to a water supply and said outlet being connected to said disengaging chamber so that water and air are supplied to said disengaging chamber,
an air outlet in said disengaging chamber,
a water outlet at the bottom of said disengaging chamber,
a back pressure regulator in said water outlet, said back pressure regulator being adjustable to permit release of said pressure regulator being adjustable to permit release of said water through said water outlet when the static pressure of water in said disengaging chamber reaches a desired level so that the static air pressure present in the space at the top of said disengaging chamber may be adjusted, said disengaging chamber being divided into first, second and third compartments, the outlet of said water aspirator being connected to the top of said first compartment,
a passageway connecting the top of said first compartment with the top of said second compartment for passage of air therethrough,
a passageway connecting the bottom of said first compartment with the bottom of said second compartment for passage of water therethrough, and
a passageway connecting the top of said second compartment with the bottom of said third compartment so that only air passes to said third compartment, said air outlet being positioned at the top of said third compartment.

7. The apparatus recited in claim 6 further including a demisting screen positioned at the bottom of said third compartment but above the passageway connecting said second compartments with said third compartment to separate large droplets of water from the air in said third compartment.

References Cited
UNITED STATES PATENTS

| | | | |
|---|---|---|---|
| 422,202 | 2/1890 | Furney. | |
| 561,160 | 6/1896 | Du Faur | 230—69 |
| 682,811 | 9/1901 | Paterson | 230—92 |
| 899,820 | 9/1908 | Abbott | 230—92 |

ROBERT M. WALKER, Primary Examiner

UNITED STATES PATENT OFFICE
CERTIFICATE OF CORRECTION

Patent No. 3489337          Dated January 21, 1970

Inventor(s) Dr. Earl J. Serfass

It is certified that error appears in the above-identified patent and that said Letters Patent are hereby corrected as shown below:

Column 5, lines 14 and 15, delete "of said pressure regulator being adjustable to permit release".

SIGNED AND SEALED

JUN 9 1970

(SEAL)
Attest:

Edward M. Fletcher, Jr.
Attesting Officer

WILLIAM E. SCHUYLER, JR.
Commissioner of Patents